US011273727B2

(12) United States Patent
Mortensen et al.

(10) Patent No.: US 11,273,727 B2
(45) Date of Patent: Mar. 15, 2022

(54) IN-MOTION ELECTRIC VEHICLE-TO-VEHICLE RECHARGING

(71) Applicant: Cisco Technology, Inc., San Jose, CA (US)

(72) Inventors: Magnus Mortensen, Cary, NC (US); Jay Kemper Johnston, Raleigh, NC (US); David C. White, Jr., St. Petersburg, FL (US); Kevin J. Klous, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 173 days.

(21) Appl. No.: 16/296,459

(22) Filed: Mar. 8, 2019

(65) Prior Publication Data

US 2020/0282857 A1 Sep. 10, 2020

(51) Int. Cl.
*B60L 53/36* (2019.01)
*B60L 53/66* (2019.01)
*B60L 53/16* (2019.01)
*H02J 7/34* (2006.01)

(52) U.S. Cl.
CPC ............ *B60L 53/66* (2019.02); *B60L 53/16* (2019.02); *B60L 53/36* (2019.02); *H02J 7/342* (2020.01); *B60Y 2200/91* (2013.01); *B60Y 2300/91* (2013.01)

(58) Field of Classification Search
CPC .................................................. B60L 53/66
USPC ................................................ 320/104, 109
See application file for complete search history.

(56) References Cited

U.S. PATENT DOCUMENTS

| 9,007,020 | B2 | 4/2015 | Prosser et al. | |
| 9,527,394 | B1* | 12/2016 | Tang | B60W 10/26 |
| 9,944,192 | B2 | 4/2018 | Ricci | |
| 10,108,202 | B1* | 10/2018 | Aikin | B60L 15/42 |
| 10,532,663 | B2* | 1/2020 | Ricci | B60L 53/65 |
| 10,942,036 | B2* | 3/2021 | Mizutani | G08G 1/202 |
| 2012/0271758 | A1* | 10/2012 | Jammer | G07F 15/005 |
| | | | | 705/39 |
| 2012/0306446 | A1* | 12/2012 | Suganuma | B60L 53/53 |
| | | | | 320/109 |
| 2017/0210239 | A1 | 7/2017 | Lin et al. | |
| 2018/0241234 | A1* | 8/2018 | Liang | H02J 7/342 |
| 2018/0290561 | A1* | 10/2018 | Baumgartner | B60L 53/126 |
| 2020/0317067 | A1* | 10/2020 | Miller | B60L 53/36 |

OTHER PUBLICATIONS

Lant, Karla., "This Patent Could Solve One of the Biggest Issues With Owning a Tesla", Advanced Transport, https://futurism.com/this-patent-could-solve-one-of-the-biggest-issues-with-owning-a-tesla/, 2 pages, Jun. 6, 2017, Futurism, LLC.

\* cited by examiner

*Primary Examiner* — Edward Tso
*Assistant Examiner* — Ahmed H Omar
(74) *Attorney, Agent, or Firm* — Behmke Innovation Group LLC; Kenneth J. Heywood; Jonathon P. Western (57) ABSTRACT

In one embodiment, a device of an electric vehicle requests in-motion charging of the electric vehicle. The device receives an indication of a charging vehicle able to provide in-motion charging to the first electric vehicle. The device coordinates in-motion docking of the electric vehicle to the charging vehicle. The device supervises in-motion charging of the electric vehicle by the charging vehicle.

18 Claims, 11 Drawing Sheets

IN-MOTION ELECTRIC VEHICLE-TO-VEHICLE RECHARGING

TECHNICAL FIELD

The present disclosure relates generally to computer networks, and, more particularly, in-motion electric vehicle-to-vehicle recharging.

BACKGROUND

Electric vehicles are becoming more and more ubiquitous and provide a number of benefits over that of petroleum-fueled vehicles. First, unlike petroleum-fueled vehicles, purely electric vehicles have zero tailpipe emissions. This lack of pollution can have a considerable effect on the environment and can reduce or even eliminate certain environmental conditions, such as smog in an urban environment. Second, electric vehicles allow for a greater number of energy sources to be utilized. For example, an electric vehicle can be charged using electricity generated by any number of energy sources such as solar, nuclear, hydroelectric, and the like.

While electric vehicles have certain advantages over those of petroleum-fueled vehicles, transitioning the word's fleet to electric vehicles is not without difficulty. Notably, while there are many fueling stations for petroleum-fueled vehicles, there are still a comparatively sparse number of charging stations for electric vehicles. For many parts of the country, the lack of charging station availability has hindered electric vehicle adoption. Indeed, the lack of charging availability for electric vehicles remains a major technical hurdle before widespread adoption of electric vehicles can take place.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device of an electric vehicle requests in-motion charging of the electric vehicle. The device receives an indication of a charging vehicle able to provide in-motion charging to the first electric vehicle. The device coordinates in-motion docking of the electric vehicle to the charging vehicle. The device supervises in-motion charging of the electric vehicle by the charging vehicle.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Figure 1A:
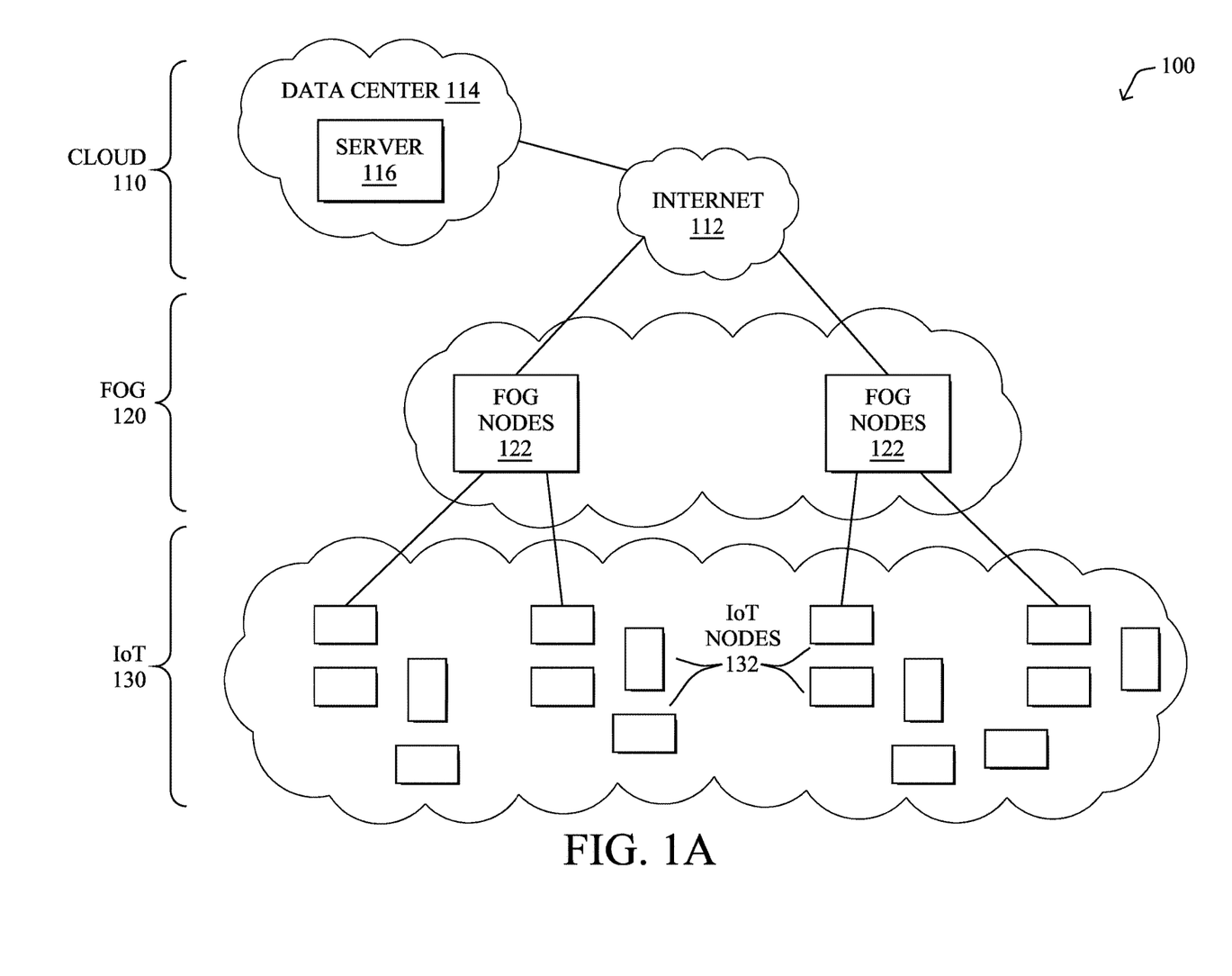
FIGS. 1A-1B illustrate an example communication network.

FIG. 1A is a schematic block diagram of an example simplified communication network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
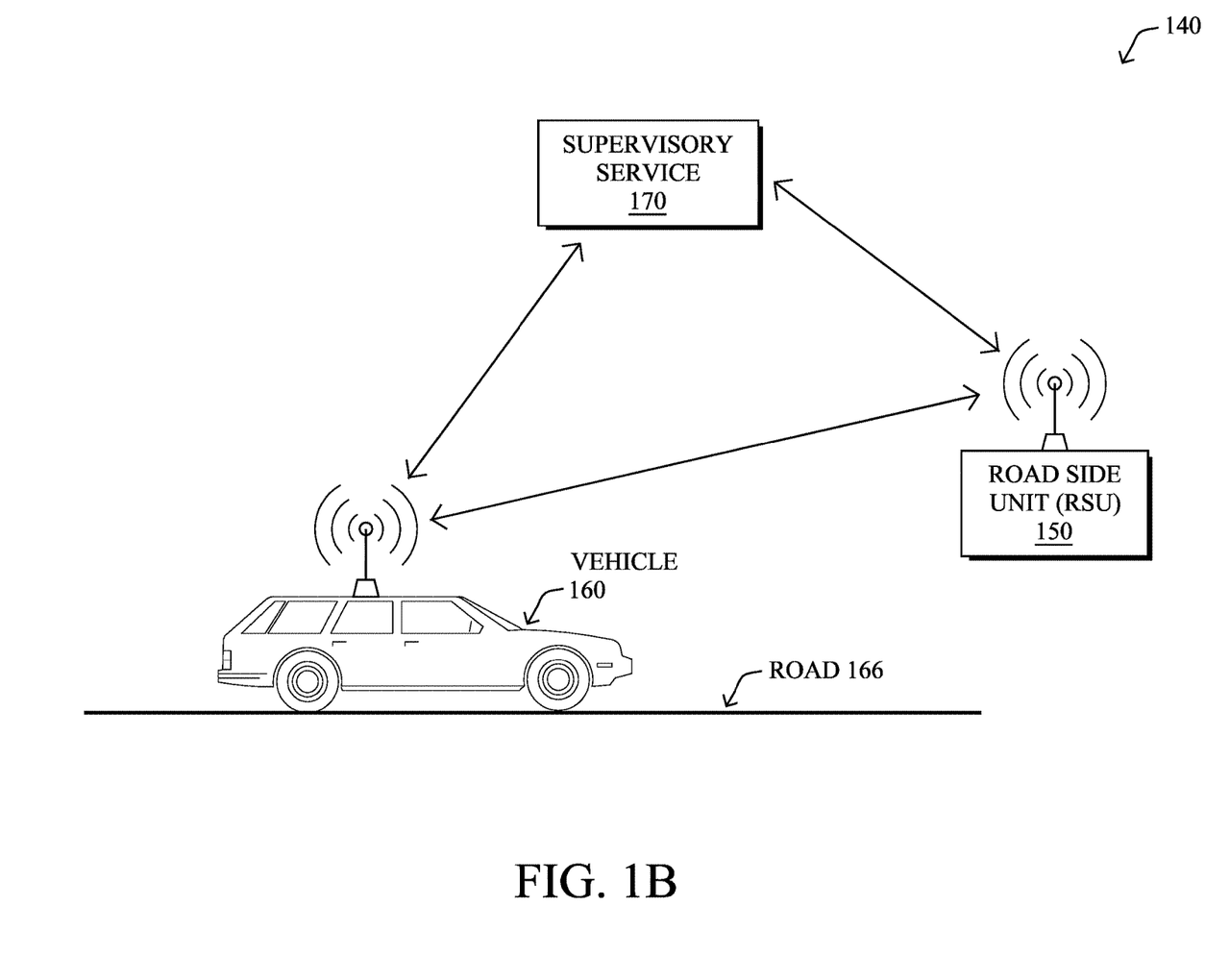

FIG. 1B illustrates an example vehicle communication system 140, according to various embodiments. In particular, vehicle communication system 140 may include any or all of the following components: a vehicle 160, a roadside unit (RSU) 150, and/or a remote supervisory service 170. Generally, vehicle 160 may be any form of vehicle configured to move from one physical location to another such as, but not limited to, cars, buses, trucks, boats, trains, aerial vehicles, and the like. In many cases, vehicle 160 may be configured to transport people and/or cargo. Further, vehicle 160 may be an autonomous vehicle, semi-autonomous vehicle, or manually-operated vehicle, according to the various embodiments herein.

In some embodiments, vehicle communication system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, RSU 150 may be a fog node 122 at fog computing layer 120, while vehicle 160 may be viewed as an IoT node 132 at IoT layer 130. Thus, vehicle 160 may communicate directly with RSU 150, and/or via other IoT nodes 132 (e.g., other vehicles, etc.), and RSU 150 may provide some degree of processing over the communicated data.

RSU 150 may communicate with supervisory service 170 via a WAN, such as the Internet 112 or another WAN. For example, RSU 150 may communicate with supervisory service 170 by leveraging a hardwired network connection, cellular or other wireless connection, satellite connection, or the like. Communications between vehicle 160 and RSU 150 may generally be wireless and use any form of known wireless communication (e.g., Wi-Fi, cellular, light-based, etc.).

As would be appreciated, vehicle 160 may comprise its own local network, to allow the various components of vehicle 160 to communicate with one another. For example, vehicle 160 may comprise any number of sub-networks, such as a Controller Area Network (CAN) bus, an IP network, etc., to allow the various systems of vehicle 160 to communicate with one another. Such system may include, but are not limited to, an engine control unit (ECU), a battery management system (BMS) that manages the local battery of vehicle 160, an advanced driver assistance system (ADAS) system, and the like. A local gateway of vehicle 160 may provide communicative connectivity between the local network of vehicle 160 and other devices. For example, the local gateway of vehicle 160 may provide wireless connectivity to RSU 150 located along road 166 on which vehicle 160 is traveling. In some embodiments, vehicle 160 may also communicate directly with supervisory service 170 via the Internet 112 or another WAN, such as by leveraging a wireless connection to a cellular or satellite-based network.

Figure 2:
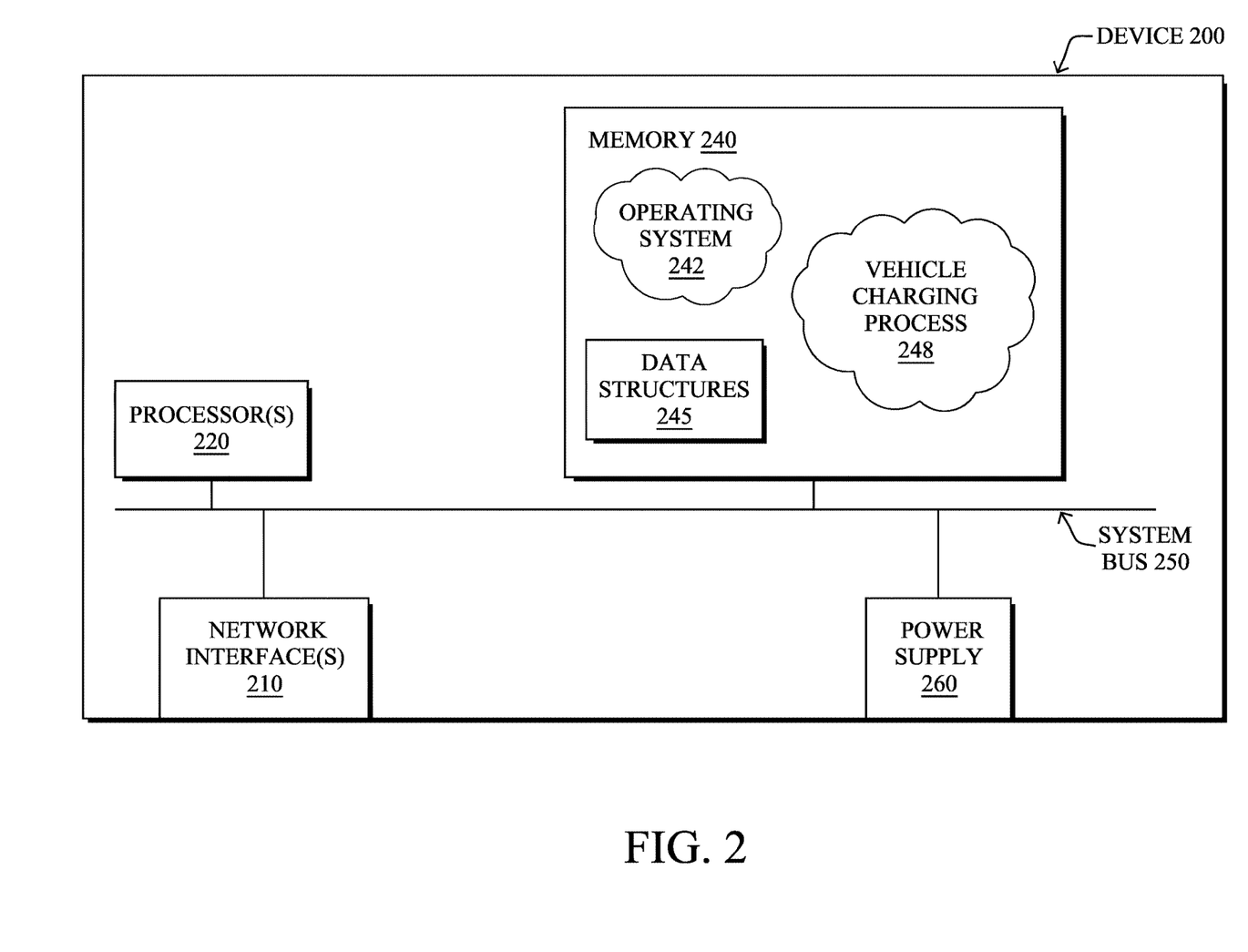
FIG. 2 illustrates an example network device/node.

FIG. 2 is a schematic block diagram of an example computing device/node 200 that may be used with one or more embodiments described herein e.g., as any of the devices shown in FIGS. 1A-1B above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative vehicle charging process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, concerns about recharging remain the key hurdle to mass adoption of electric vehicles. Notably, recharging stations for electric vehicles are relatively few and far between, in comparison to traditional gas stations. Moreover, recharging an electric vehicle also takes longer than filling up a petroleum-based vehicle with gasoline or diesel fuel. For longer trips that may require multiple stops to refuel, this can add significantly to the overall travel time.

In-Motion Electric Vehicle-to-Vehicle Recharging

The techniques herein address the range limitations of electric vehicles by enabling electric vehicles to perform charging while in-motion with the assistance of one or more other vehicles that are in the vicinity of the intended path of travel. In some aspects, an electric vehicle may leverage vehicle-to-vehicle (V2V) and/or vehicle-to-infrastructure (V2I) communications, to request in-motion charging.

Specifically, according to one or more embodiments of the disclosure as described in detail below, a device of an electric vehicle requests in-motion charging of the electric vehicle. The device receives an indication of a charging vehicle able to provide in-motion charging to the first electric vehicle. The device coordinates in-motion docking of the electric vehicle to the charging vehicle. The device supervises in-motion charging of the electric vehicle by the charging vehicle.

Illustratively, the techniques described herein may be performed by hardware, software, and/or firmware, such as in accordance with the vehicle charging process 248, which may include computer executable instructions executed by the processor 220 (or independent processor of interfaces 210) to perform functions relating to the techniques described herein.

Operationally, the techniques herein introduce a recharging approach for electric vehicles, which are typically limited in their operation range, that leverages nearby vehicles and/or specialized charging vehicles, to extend their operational range. In various embodiments, the techniques herein introduce both an ad-hoc recharging approach whereby an electric vehicle uses V2V communications to request charging from nearby vehicles, as well as an approach whereby the vehicle leverages a cloud-based service to request and orchestrate on-path charging from other vehicles.

Figure 3A:
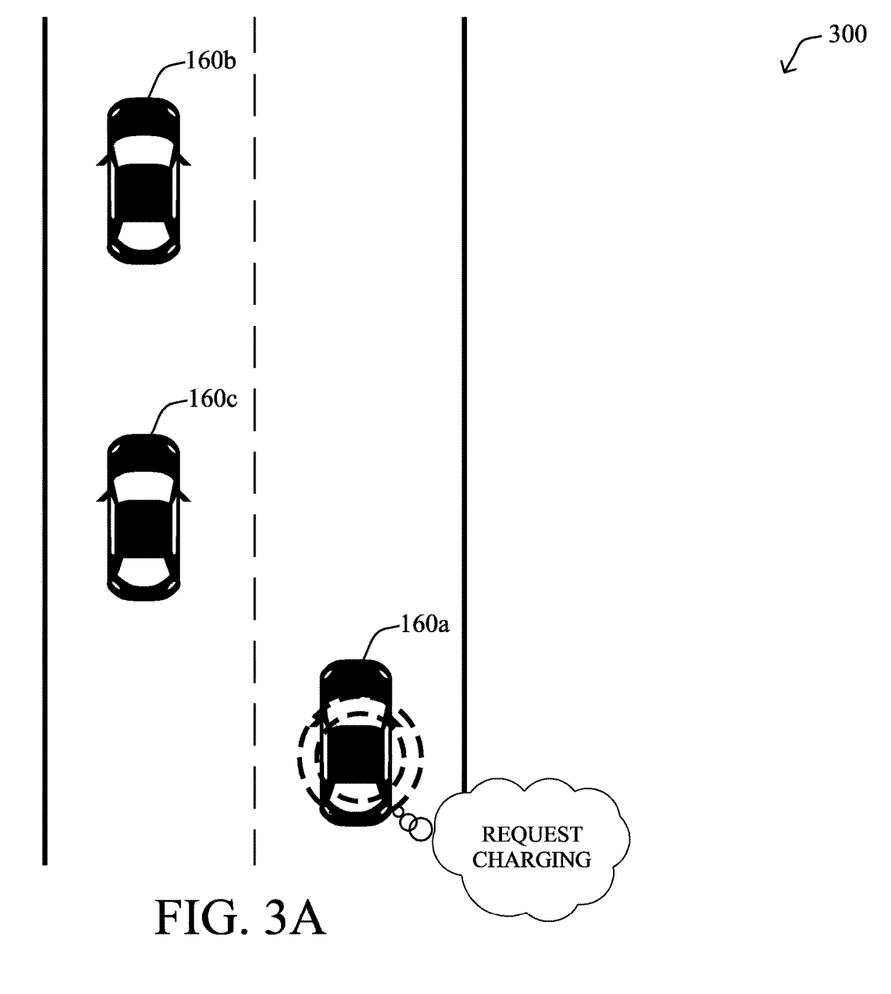
FIGS. 3A-3D illustrate an example of an electric vehicle receiving in-motion charging by another vehicle.

FIGS. 3A-3D illustrate an example of an electric vehicle receiving in-motion charging by another vehicle, according to various embodiments. As shown in FIG. 3A, assume that there is a first electric vehicle, vehicle 160a, that determines that it does not have enough charge to reach its destination. Today, vehicle 160a may retrieve navigation information for the nearest charging station and navigate to the charging station for recharging. However, doing so may significantly increase the travel time to the destination, as the charging station may not be located along the path to the destination. In addition, recharging of an electric vehicle is a considerably slow process, taking anywhere from thirty minutes up to twelve hours to complete.

As shown in FIG. 3A, rather than diverting to a charging station to receive charging, electric vehicle 160a may leverage V2V communications, to request charging from any of the other nearby vehicles. For example, assume that electric vehicle 160a is within V2V communication distance of two other vehicles: vehicle 160b and vehicle 160c. Across a communication medium, such as V2V, vehicle 160a may broadcast the charging request to vehicles 160b-160c. Such a request may indicate the type of charge being requested, as well as navigation information for electric vehicle 160a indicative of an intended path of travel of vehicle 160a. By providing the route information to the other vehicles, this allows vehicles 160b-160c to determine whether they can provide charging to vehicle 160a and, if so, for how long.

Figure 3B:
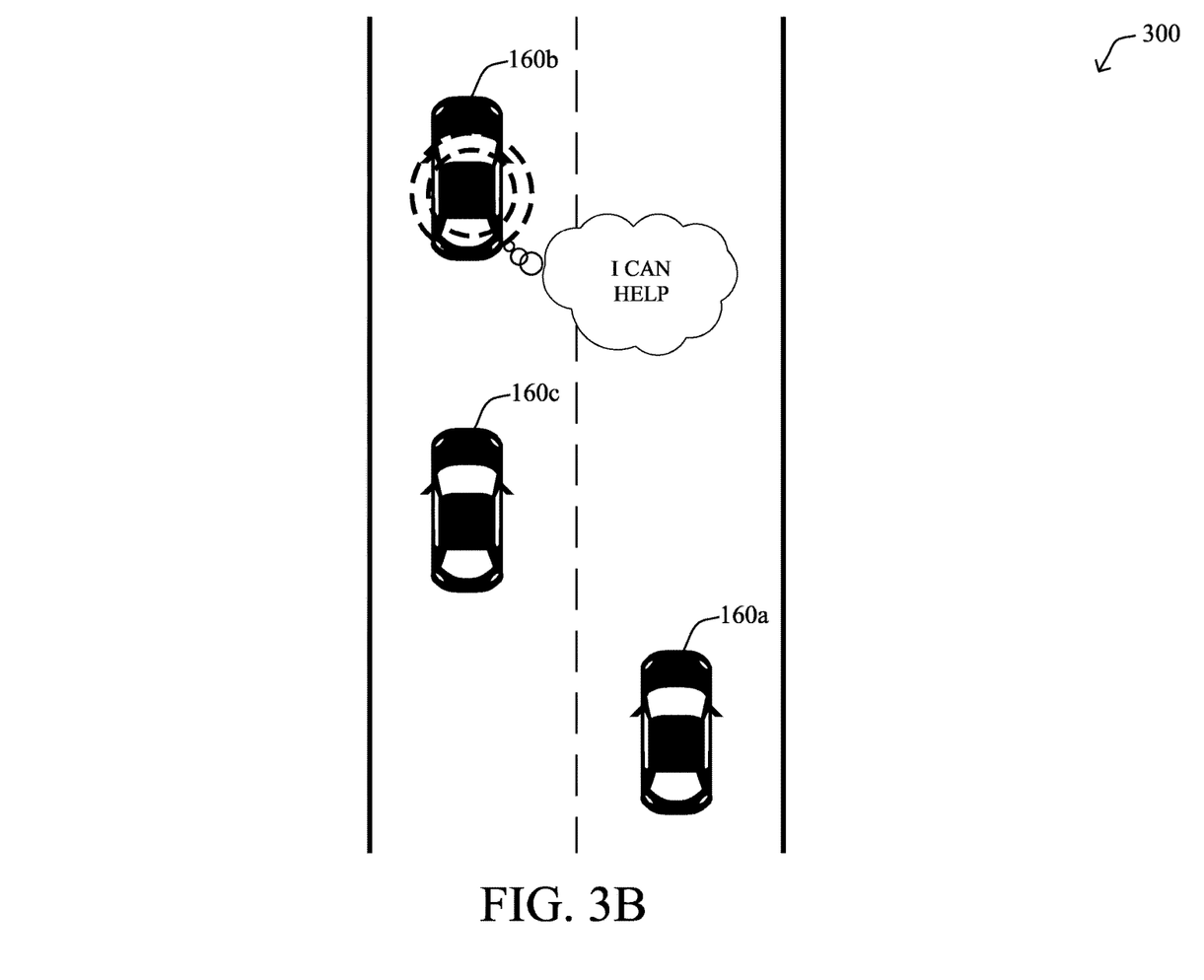

As shown in FIG. 3B, if a nearby electric vehicle is able to help provide charge to vehicle 160a, it may notify vehicle 160a that it can do so. For example, assume that vehicle 160c receives the charging request from vehicle 160a, can provide suitable charging, but is going to diverge from the path of travel of vehicle 160a soon (e.g., vehicle 160c is going to take the next exit and vehicle 160a is not). In such a case, vehicle 160c may determine that it is not a candidate to provide charging to vehicle 160a and either not respond to the charging request or actively respond that it cannot provide charge.

For purposes of illustration, assume that vehicle 160b is going to travel along the same route/path of travel as vehicle 160a for a threshold amount of time and can provide charging to vehicle 160a (e.g., doing so will not cause vehicle 160b to have insufficient charge to reach its destination). In such a case, vehicle 160b may send a V2V communication to vehicle 160a, notifying vehicle 160a that it can provide in-motion charging to vehicle 160a. In some embodiments, an indication of the charging request from vehicle 160a may be presented to the driver of vehicle 160b, to confirm the in-motion charging, prior to responding positively to vehicle 160a. For example, there may be financial incentives for the owner of vehicle 160b to provide charge to vehicle 160a. In further embodiments, the nearby vehicles of electric vehicle 160a may participate in an ad-hock auction, to determine which vehicle can provide charge at the lowest cost.

Figure 3C:
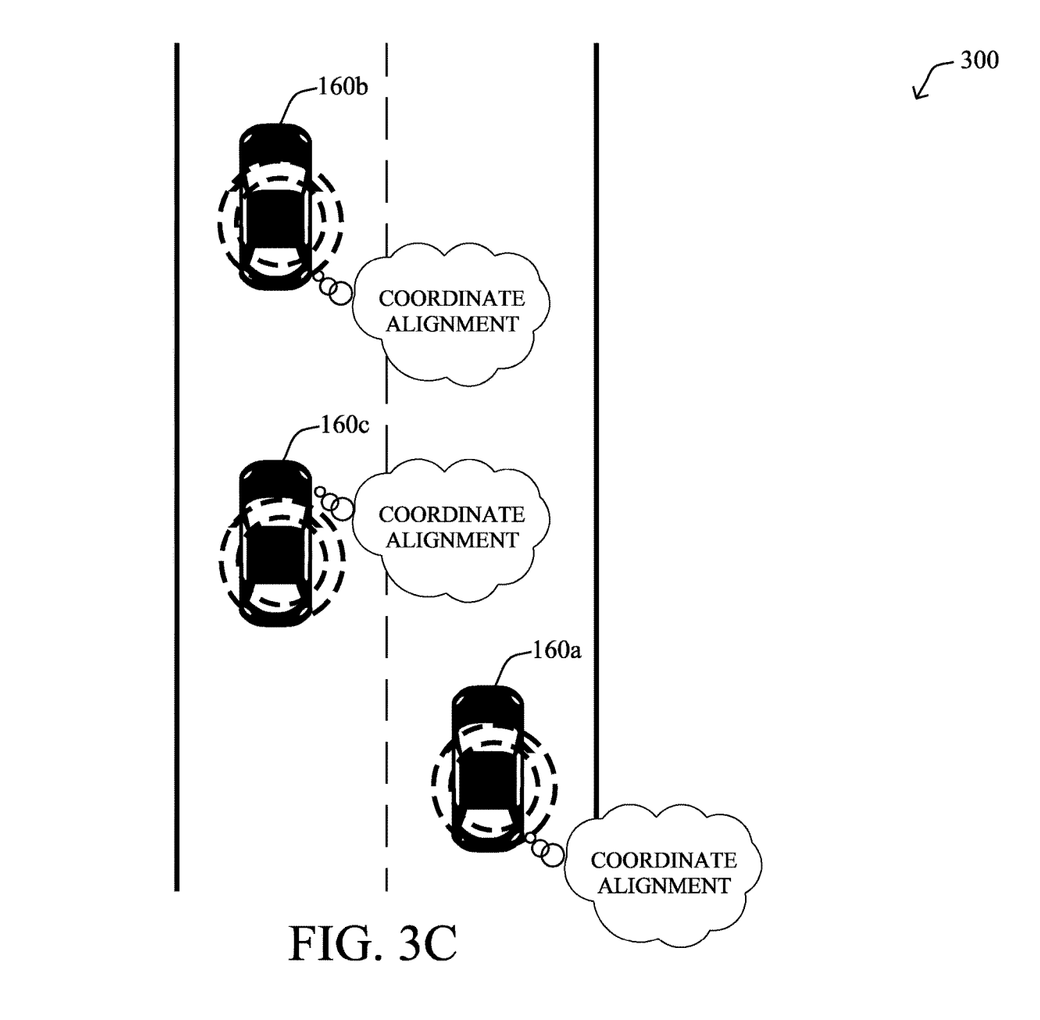

As shown in FIG. 3C, after vehicle 160b responds positively to the charging request from vehicle 160a, any or all of vehicles 160a-160c may coordinate alignment and docking of vehicles 160a and 160b for in-motion charging. For example, vehicles 160a-160c may communicate with one another, to request that either vehicle 160b move into the lane of vehicle 160a or that vehicle 160c move out of the left lane, so that vehicle 160a can take its place. In some embodiments, if any or all of vehicles 160a-160c are autonomous or semi-autonomous vehicles, they may use their computer vision, obstacle detection, or other sensor systems, to maneuver vehicle 160a within docking range of vehicle 160b.

Figure 3D:
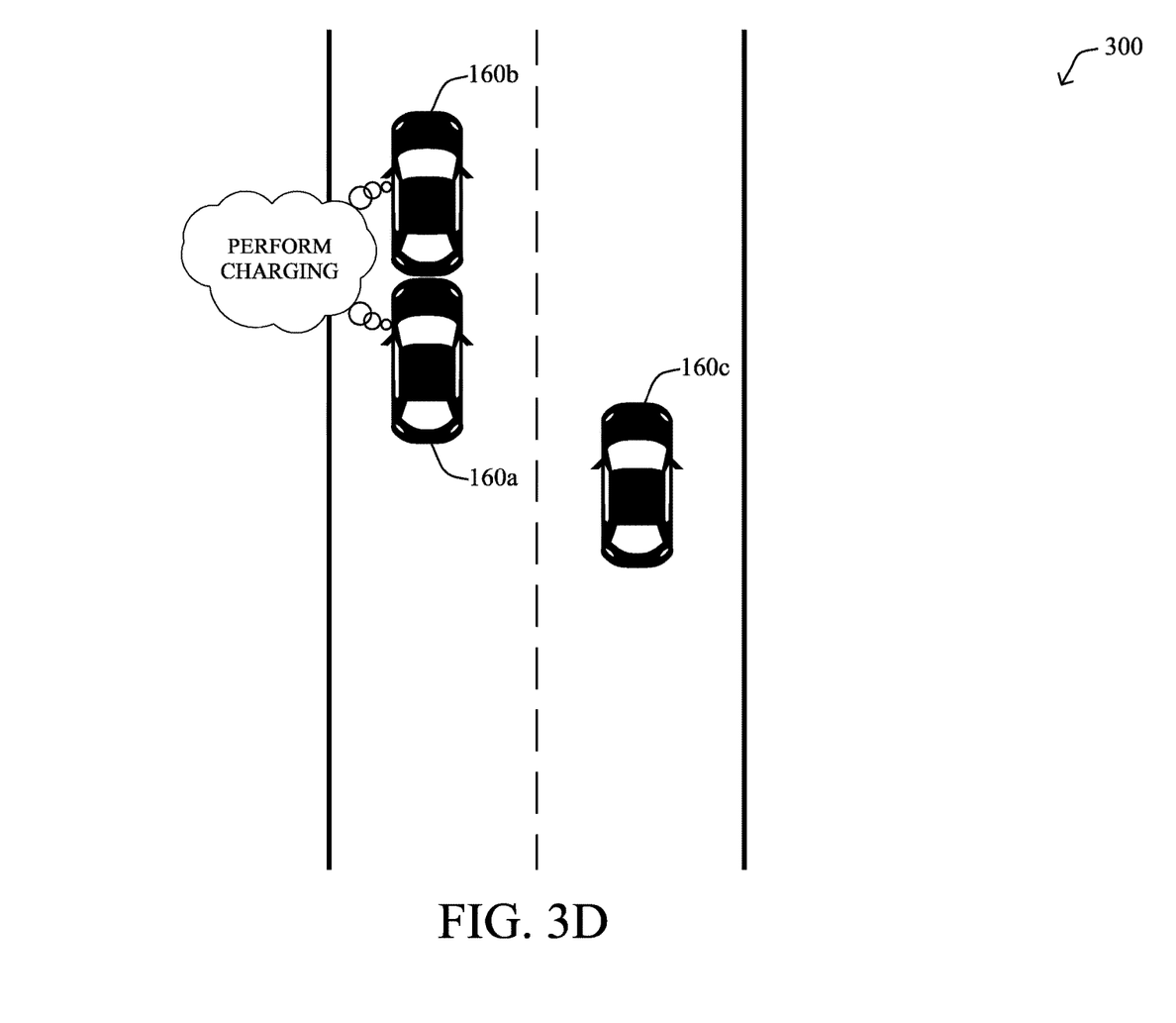

As shown in FIG. 3D, once vehicle 160a is aligned with vehicle 160b, the two vehicles may dock, thereby forming an electrical connection between the two vehicles. In turn, vehicle 160b may transfer charge to the battery of vehicle 160a, while both vehicles are still moving. Depending on the capabilities of the two vehicles, this charge may be enough to power vehicle 160a and fill its battery or may only be enough to continue powering vehicle 160a along its path of travel, thereby reducing the drain on its own battery and effectively increasing the operating range of vehicle 160*a*.

The transfer of charge from one vehicle to another while in-motion can be achieved in a number of ways. Indeed, for one vehicle to recharge another vehicle, they must form a linkage over which power will be transferred. In various embodiments, each vehicle involved in the in-motion charging process may be equipped with any or all of the following components:

1. A bumper connector receptacle.
2. An auto extending bumper armature and cabling.
3. An automated system to align the vehicles and supervise the transfer of data and charge between the vehicles.

Figure 4A:
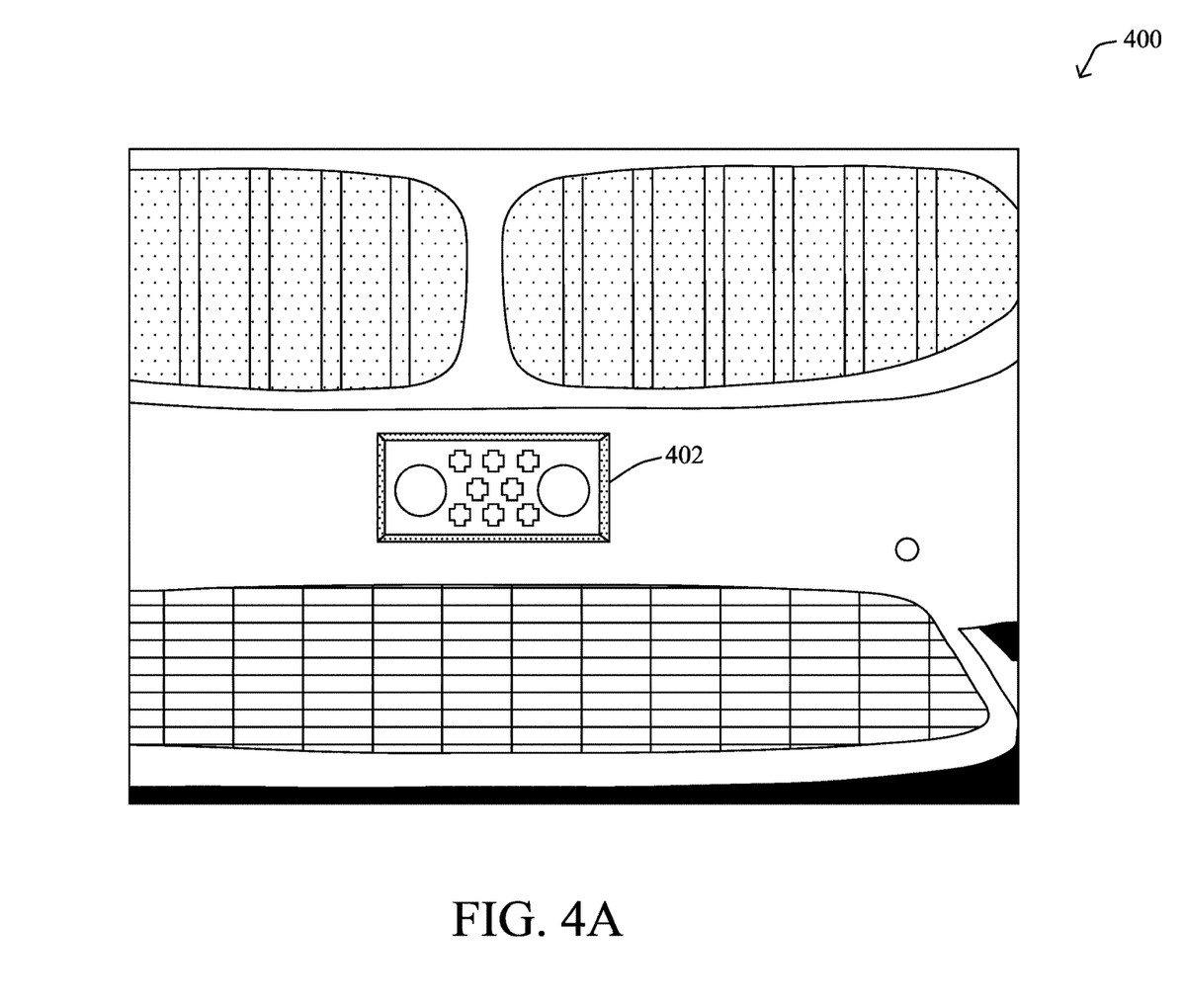
FIGS. 4A-4B illustrate examples of a docking mechanism for in-motion charging of an electric vehicle.

FIG. 4A illustrates an example front bumper 400 of an electric vehicle that can be used to perform in-motion charging. As shown, bumper 400 may include a receptacle 402 that comprises any number of contacts and/or electrodes via which data and power can be exchanged with another vehicle. For example, receptacle 402 may include positive, negative, and/or ground electrodes that are configured to dock with corresponding electrodes of another vehicle. In addition, receptacle 402 may include one or more data connections, allowing the docked vehicles to exchange data via a hardwired connection, instead of wirelessly. Further, receptible 402 may include any number of sensors, such as ultrasonic sensors, cameras, infrared sensors, etc., to ensure proper alignment of receptacle 402 with a corresponding receptacle on the other vehicle.

Figure 4B:
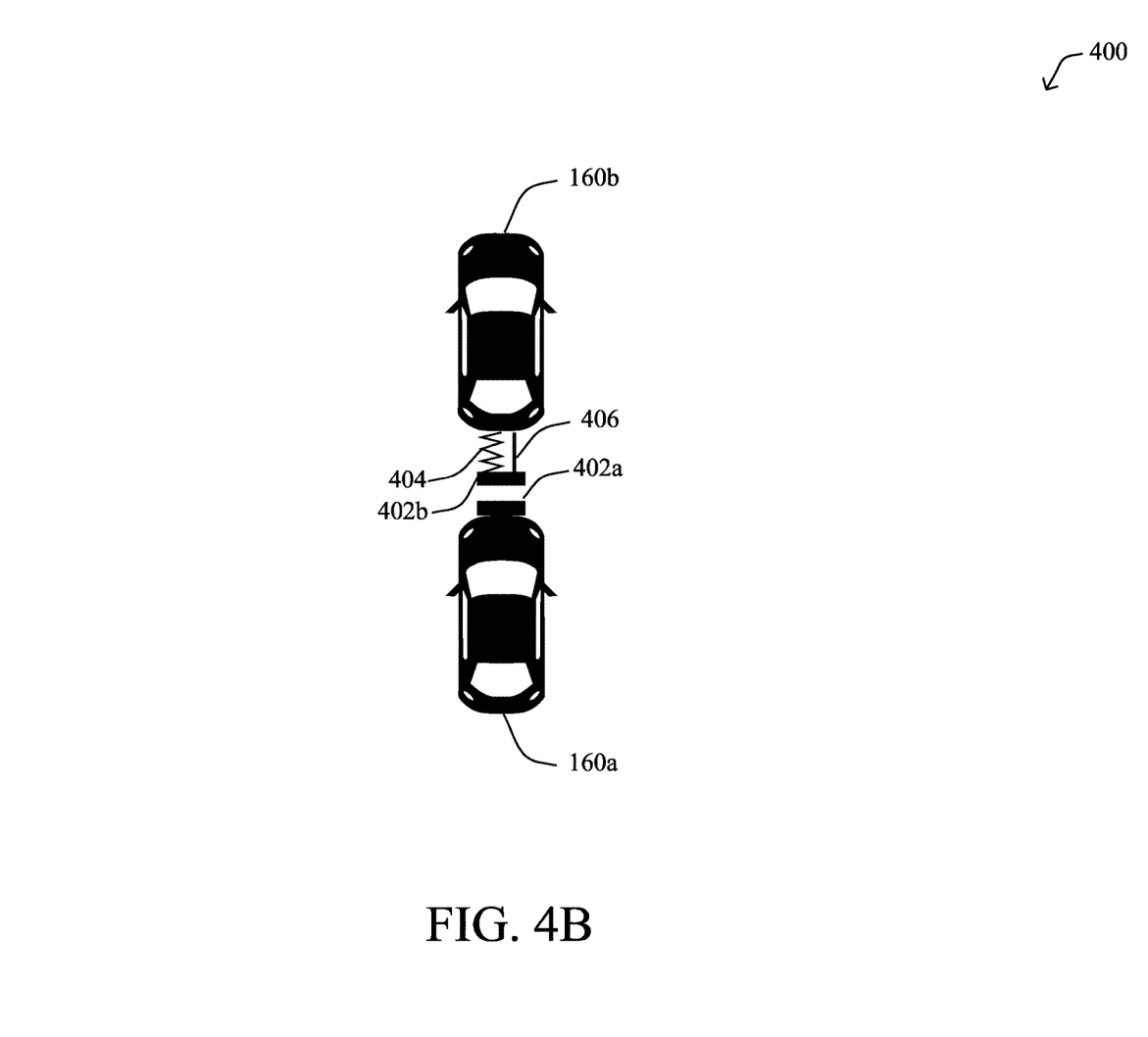

As shown in FIG. 4B, either or both of the vehicles involved in the charging may also be equipped with an auto-extending and retracting apparatus, to dock vehicles 160*a*-160*b* with one another for in-motion charging. For example, vehicles 160*a* and 160*b* may each have a receptacle 402*a* and 402*b*, respectively, that are configured to pair with one another. In various embodiments, each of receptacles 402*a* and 402*b* may be equipped with electromagnets, magnets, mechanical fasteners, or the like, to ensure that receptacles 402*a* and 402*b* remain connected during charging.

In some embodiments, either or both of receptacles 402*a*-402*b* may be coupled to an extendable armature and cabling. For example, receptacle 402*b* may be coupled to an extender 406 that pushes receptacle 402*b* towards receptacle 402*a* of vehicle 160*a*. To convey charge and/or power to vehicle 160*a*, receptacle 402*b* may also be coupled to cabling 404. Thus, during the docking procedure, vehicle 160*b* may actuate extender 406, to vehicle 160*b* to "reach" backwards with receptacle 402*b* while in motion and make contact with receptacle 402*a* of vehicle 160*a*.

Once receptacles 402*a*-402*b* are connected, vehicle 160*b* may retract extender 406, leaving receptacle 402*b* coupled with receptacle 402*a* and cabling 404 suspended between the bumpers of the two vehicles. In turn, vehicles 160*a*-160*b* may coordinate the transfer of charge from vehicle 160*b* to vehicle 160*a*. Should vehicles 160*a*-160*b* move too far away, the fasteners of receptacles 402*a*-402*b* may be such that the two can be separated safely. Cabling 404 may also be sufficiently rigid to support receptacle 402*b* off the roadway, if receptacles 402*a*-402*b* become decoupled.

In order to create a successful linkage between receptacles 402*a*-402*b*, either or both of vehicles 160*a*-160*b* may need to make some safe and minor movements. This may be done leveraging any number of mechanisms. For example, either or both of vehicles 160*a*-160*b* may use computer vision, to identify the precise locations of receptacles 402*a*-402*b* relative to one another and orient the two, accordingly. In another embodiment, the bumpers or receptacles 402 or vehicles 160*a*-160*b* may include markings, such as QR codes or other visual signatures, to facilitate the alignment and docking of receptacles 402*a*-402*b*. V2V communications can also be used, to further indicate the movements necessary for alignment in tandem.

As noted, receptacles 402*a*-402*b* may also convey data between vehicles 160*a*-160*b* during in-motion charging, in some embodiments. Connecting both power and data between the vehicles is advantageous since they will now be traveling in a very tight, fleet-like state where communication between vehicles 160*a*-160*b* (e.g., regarding movement, obstacles, speed braking, etc.) must be much faster and more reliable than wireless. The added data aspect of the inter-car tether can be used to effectively link the in-car networks of both vehicles 160*a*-160*b*, thereby providing the lowest latency communication between the drive systems. Once coupled, the lead vehicle (e.g., vehicle 160*b*) may effectively "drive" both vehicles, until the rear vehicle needs to depart for its own navigational purposes. Then, once charging is complete, or vehicles 160*a*-160*b* otherwise need to depart from one another, extender 406 may be actuated again, to retrieve receptacle 402*b* back towards the bumper of vehicle 160*b*.

Note that the example shown in FIG. 4B is illustrative and any number of different configurations are possible using the techniques herein. For example, while receptacles 402*a*-402*b* are shown located near the center bumpers of their respective vehicles 160*a*-160*b*, they could be located anywhere on the bumpers, in further embodiments. In addition, while charging vehicle 160*b* is shown extending receptacle 402*b* towards vehicle 160*a*, further embodiments provide for vehicle 160*a* extending receptacle 402*a* towards vehicle 160*b*, in a similar manner. This could even allow both of vehicles 160*a*-160*b* to extend their receptacles 402*a*-402*b* towards one another, essentially meeting in the middle. Further, while charging vehicle 160*b* is shown as the lead vehicle, other embodiments provide for the positions of the two vehicles 160*a*-160*b* to be transposed, with their receptacles 402*a*-402*b* being located on the opposing bumper or each vehicle having both front and rear receptacles.

In some embodiments, multiple charging vehicles can also provide in-motion charging to vehicle 160*a*. For example, if so equipped with front and rear receptacles, charging vehicles may be docked to the front and rear of vehicle 160*a*, thereby forming an even larger fleet/chain of vehicles that are interlinked with one another. In yet another embodiment, one or more charging vehicles may be configured to operate as a pass-through vehicle for another charging vehicle, allowing multiple vehicles in a row to provide charge to vehicle 160*a*. For example, two charging vehicles may be located in front of vehicle 160*a* or behind vehicle 160*a* and provide charge to vehicle 160*a* while in motion. In this way, any number of vehicles may be daisy chained to one another, to form a fleet of vehicles that travel as a group.

In various embodiments, a cloud-based service may also assist the in-motion charging of an electric vehicle. For example, if there are no vehicles within close proximity of the vehicle requiring charging, the requesting vehicle can also send a V2I request to a supervisory service that orchestrates the meeting of the requesting vehicle with a charging vehicle.

Figure 5:
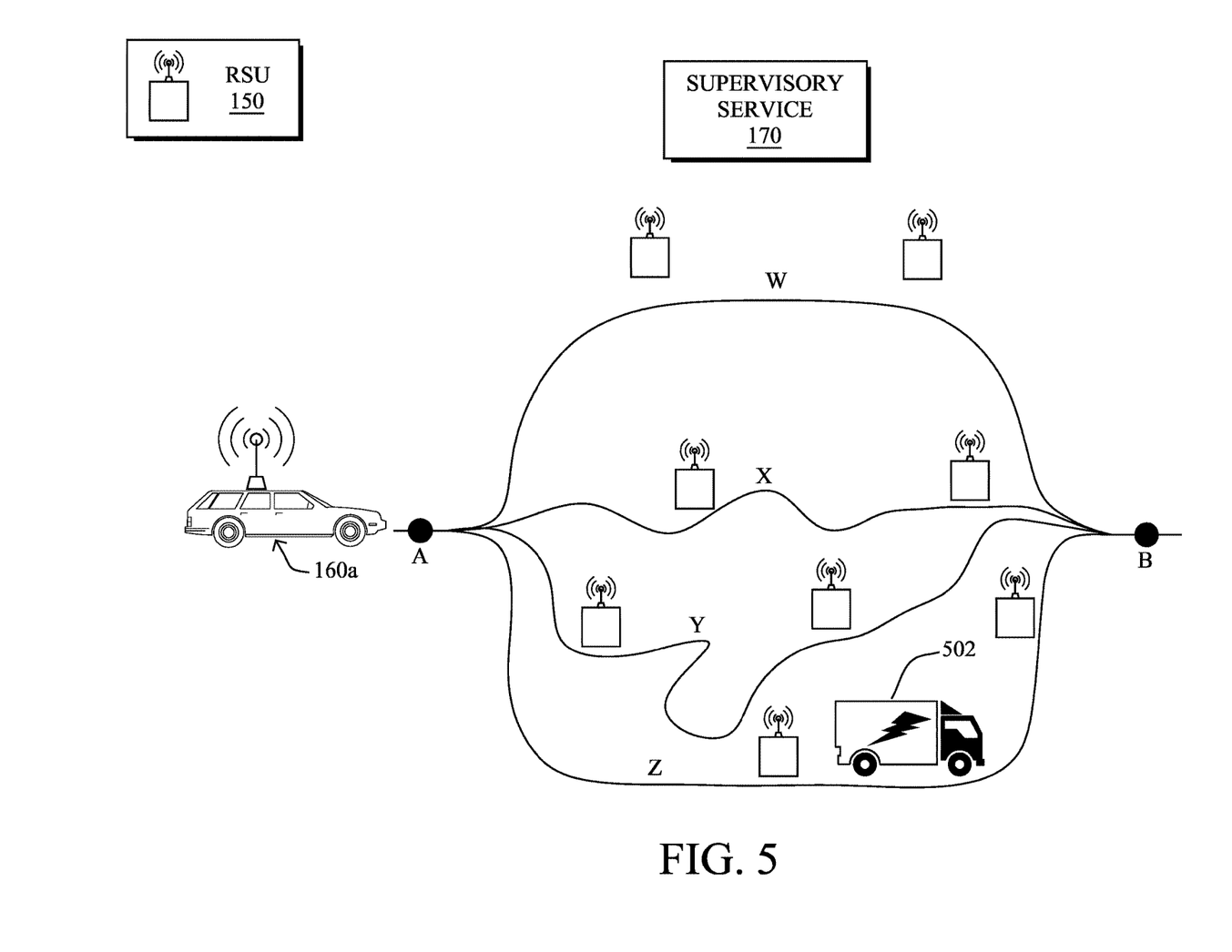
FIG. 5 illustrates an example of a service coordinating in-motion recharging of an electric vehicle.

As shown in FIG. 5, assume that vehicle 160*a* again requires charging, but that there are no other vehicles nearby that can provide in-motion charging. In such a case, vehicle 160*a* may send a V2I-based charging request to supervisory service 170, e.g., via an RSU 150, a cellular or satellite connection, or the like. Similar to a V2I request, a charging request sent to supervisory service 170 may include navigation information indicative of the intended path of travel between vehicle 160*a* and its destination. For example, assume that vehicle 160*a* is approaching a point A that branches into multiple paths W, X, Y, and Z, that eventually converge again at point B. In such a case, vehicle 160*a* may indicate in its charging request that it intends to travel along path X to point B, as it moves towards its final destination.

In response to receiving a charging request from vehicle 160*a*, supervisory service 170 may identify any vehicles capable of charging vehicle 160*a* that are in the area. In some embodiments, supervisory service 170 may identify another vehicle, such as vehicle 502, that is dedicated to providing in-motion charging to other electric vehicles on the road. In other words, supervisory service 170 may oversee a set of specifically designated charging vehicles and/or any other vehicles that agree to provide charge to other vehicles. For example, the on-demand, dedicated charging vehicles may be purposely configured with large batteries or generators to provide in-motion charging to other electric vehicles.

Supervisory service 170 may take into account any number of factors, to select charging vehicle 502 to provide in-motion charging to vehicle 160*a*. For example, supervisory service 170 may take into account any or all of the following, to select charging vehicle 502 to provide in-motion charging to vehicle 160*a*:

- The current locations of vehicle 160*a* and charging vehicle 502
- The current state of charging vehicle 502 (e.g., busy charging another vehicle, low on available charge, etc.)
- Navigation information for vehicle 160*a*
- Timing information, to ensure that vehicle 160*a* and charging vehicle 502 can meet within a certain timeframe.
- Cost information, as some charging vehicles may cost more to use than others. In some cases, service 170 may also conduct an auction among potential charging vehicles in which providers bid for the ability to charge vehicle 160*a*.

For example, based on the above information, supervisory service 170 may determine that vehicle 160*a* can meet up with charging vehicle 502 after point B, if it proceeds at a certain speed. Similarly, supervisory service 170 may determine that charging vehicle 502 is able to meet up with vehicle 160*a* if it proceeds along path Z at a certain speed. In turn, supervisory service 170 may provide information back to vehicle 160*a* and to charging vehicle 502, to coordinate the two vehicles moving within proximity of one another.

Once vehicle 160*a* and charging vehicle 502 are within V2V proximity of one another, they may complete the docking process and charging process, as detailed above. In some embodiments, this may also entail vehicle 160*a* and charging vehicle 502 exchanging authorization information with each other and/or supervisory service 170, to ensure that charging vehicle 502 provides charge to the correct vehicle.

Figure 6:
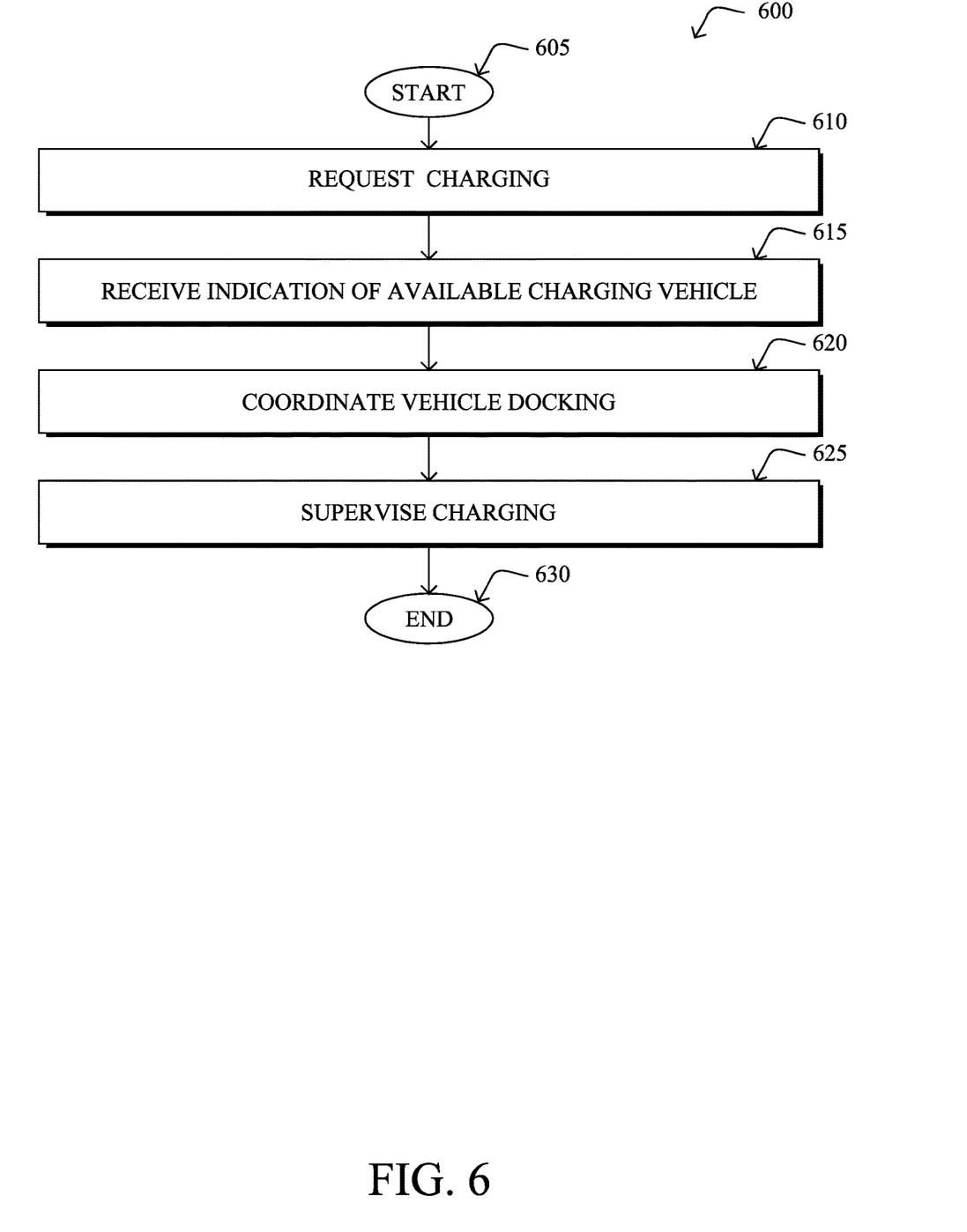
FIG. 6 illustrates an example simplified procedure for in-motion electric vehicle-to-vehicle recharging.

FIG. 6 illustrates an example simplified procedure for in-motion electric vehicle-to-vehicle recharging, in accordance with one or more embodiments described herein. For example, a non-generic, specifically configured device (e.g., device 200) of an electric vehicle may perform procedure 600 by executing stored instructions (e.g., process 248). The procedure 600 may start at step 605, and continues to step 610, where, as described in greater detail above, the device of the electric vehicle may request in-motion charging of the electric vehicle. In some embodiments, the device may send the charging request as a vehicle to vehicle (V2V) communication to one or more vehicles within communication range of the electric vehicle. In other embodiments, the device may send the request as a vehicle to infrastructure (V2I) communication to a service that selects the charging vehicle. In either case, the request may include navigation information for the electric vehicle indicative of a path of travel of the electric vehicle, the amount of charging the electric vehicle requires, authorization information, and/or any other information that can be used to identify a charging vehicle to provide charge to the electric vehicle.

At step 615, as detailed above, the device may receive an indication of a charging vehicle able to provide in-motion charging to the first electric vehicle. For example, a nearby vehicle may send a V2V communication to the device indicating that the other vehicle can provide charging. Alternatively, the supervisory service may identify the charging vehicle and provide details back to the device, to facilitate the two meeting along the path of travel of the electric vehicle.

At step 620, the device may coordinate in-motion docking of the electric vehicle to the charging vehicle, as described in greater detail above. In various embodiments, the electric vehicle and the charging vehicle may each have one or more electrodes that need to be docked, in order to transfer charge from the charging vehicle to the electric vehicle. In some embodiments, the electrodes of either or both vehicles may be coupled to an extender and cabling that extends the electrodes towards the opposing vehicle. In further embodiments, multiple vehicles can be chained together in this manner, such that multiple charging vehicles provide charge to the electric vehicle. Additionally, coordination of the in-motion docking between the vehicle may entail controlling the position of the electric vehicle relative to the charging vehicle, so that their electrodes are aligned and/or communicating with the charging vehicle so that it can align itself.

At step 625, as detailed above, the device may supervise the in-motion charging of the electric vehicle by the charging vehicle. For example, the device may monitor the charging rate and provide data regarding the charging to a user interface, calculate an amount of time remaining for the charging to complete, detect when the electrodes become disconnected, initiate retraction of an electrode on completion of the charging, navigate on behalf of both vehicles (e.g., if the electric vehicle is in the lead), and/or perform any other supervisory functions over the in-vehicle charging. Procedure 600 then ends at step 630, such as when the electric vehicle has obtained an appropriate level of charge from the charging vehicle, the two vehicles are no longer able to travel together on a path, etc.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the extension of the driving range of an electric vehicle by leveraging in-motion charging by one or more other vehicles. In some aspects, the in-motion charging can be performed while the electric vehicle requiring charge is enroute to its destination. Doing so can allow the electric vehicle to be recharged, even when charging stations are not nearby, and have little to no impact on the travel time to the destination.

While there have been shown and described illustrative embodiments that provide for in-motion charging of an electric vehicle, it is to be understood that various other adaptations and modifications may be made within the spirit and scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   requesting, by a device of an electric vehicle, in-motion charging of the electric vehicle by sending a vehicle to infrastructure (V2I) communication to a service that selects a charging vehicle among a plurality of charging vehicles, wherein the V2I communication includes navigation information indicative of an intended path between the electric vehicle and its destination;
   receiving, at the device, an indication of the charging vehicle being able to provide in-motion charging to the electric vehicle;
   coordinating, by the device, in-motion docking of the electric vehicle to the charging vehicle at a location along the intended path; and
   supervising, by the device, in-motion charging of the electric vehicle by the charging vehicle,
   wherein coordinating in-motion docking of the electric vehicle to the charging vehicle comprises:
      communicating, by the device, with the plurality of charging vehicles so as to cause movement of another charging vehicle that is different than the charging vehicle,
      wherein the movement of the other charging vehicle helps the electric vehicle align with the charging vehicle for the in-motion docking.

2. The method as in claim 1, wherein requesting in-motion charging of the electric vehicle comprises:
   sending, by the device, a vehicle to vehicle (V2V) communication to one or more vehicles within communication range of the electric vehicle.

3. The method as in claim 1, wherein coordinating in-motion docking of the electric vehicle to the charging vehicle comprises:
   navigating the electric vehicle to the charging vehicle; and
   actuating an extender to connect one or more electrodes of the electric vehicle to the charging vehicle.

4. The method as in claim 3, wherein supervising in-motion charging of the electric vehicle by the charging vehicle comprises:
   determining that the in-motion charging is complete; and
   retracting the one or more electrodes from the charging vehicle.

5. The method as in claim 1, wherein the charging vehicle is a first charging vehicle, and wherein the method further comprises:
   coordinating, by the device, docking of the electric vehicle to a second charging vehicle, while the electric vehicle is docked to the first charging vehicle.

6. The method as in claim 1, wherein coordinating in-motion docking of the electric vehicle to the charging vehicle comprises:
   aligning the electric vehicle to receive an electrode extended from the charging vehicle.

7. The method as in claim 1, wherein requesting in-motion charging of the electric vehicle comprises:
   sending a charging request that includes navigation information for the electric vehicle indicative of a path of travel of the electric vehicle.

8. The method as in claim 1, wherein supervising in-motion charging of the electric vehicle by the charging vehicle comprises:
   communicating with the charging vehicle while docked with the charging vehicle; and
   coordinating movement of the electric vehicle and charging vehicle in tandem.

9. An apparatus, comprising:
   one or more network interfaces to communicate with a network;
   a processor coupled to the network interfaces and configured to execute one or more processes; and
   a memory configured to store a process executable by the processor, the process when executed configured to:
      request in-motion charging of an electric vehicle by sending a vehicle to infrastructure (V2I) communication to a service that selects a charging vehicle among a plurality of charging vehicles, wherein the V2I communication includes navigation information indicative of an intended path between the electric vehicle and its destination;
      receive an indication of the charging vehicle being able to provide in-motion charging to the electric vehicle;
      coordinate in-motion docking of the electric vehicle to the charging vehicle at a location along the intended path; and
      supervise in-motion charging of the electric vehicle by the charging vehicle,
   wherein the apparatus coordinates in-motion docking of the electric vehicle to the charging vehicle by:
      communicating with the plurality of charging vehicles so as to cause movement of another charging vehicle that is different than the charging vehicle,
      wherein the movement of the other charging vehicle helps the electric vehicle align with the charging vehicle for the in-motion docking.

10. The apparatus as in claim 9, wherein the apparatus requests in-motion charging of the electric vehicle by:
    sending a vehicle to vehicle (V2V) communication to one or more vehicles within communication range of the electric vehicle.

11. The apparatus as in claim 9, wherein the apparatus coordinates in-motion docking of the electric vehicle to the charging vehicle by:
    navigating the electric vehicle to the charging vehicle; and
    actuating an extender to connect one or more electrodes of the electric vehicle to the charging vehicle.

12. The apparatus as in claim 11, wherein the apparatus supervises in-motion charging of the electric vehicle by the charging vehicle by:
   determining that the in-motion charging is complete; and
   retracting the one or more electrodes from the charging vehicle.

13. The apparatus as in claim 9, wherein the charging vehicle is a first charging vehicle, and wherein the process when executed is further configured to:
   coordinate docking of the electric vehicle to a second charging vehicle, while the electric vehicle is docked to the first charging vehicle.

14. The apparatus as in claim 9, wherein the apparatus coordinates in-motion docking of the electric vehicle to the charging vehicle by:
   aligning the electric vehicle to receive an electrode extended from the charging vehicle.

15. The apparatus as in claim 9, wherein the apparatus requests in-motion charging of the electric vehicle by:
   sending a charging request that includes navigation information for the electric vehicle indicative of a path of travel of the electric vehicle.

16. The apparatus as in claim 9, wherein the apparatus supervises in-motion charging of the electric vehicle by the charging vehicle by:
   communicating with the charging vehicle while docked with the charging vehicle; and
   coordinating movement of the electric vehicle and charging vehicle in tandem.

17. A tangible, non-transitory, computer-readable medium storing program instructions that cause a device of an electric vehicle to execute a process comprising:
   requesting, by the device, in-motion charging of the electric vehicle by sending a vehicle to infrastructure (V2I) communication to a service that selects a charging vehicle among a plurality of charging vehicles, wherein the V2I communication includes navigation information indicative of an intended path between the electric vehicle and its destination;
   receiving, at the device, an indication of the charging vehicle being able to provide in-motion charging to the electric vehicle;
   coordinating, by the device, in-motion docking of the electric vehicle to the charging vehicle at a location along the intended path; and
   supervising, by the device, in-motion charging of the electric vehicle by the charging vehicle,
   wherein coordinating in-motion docking of the electric vehicle to the charging vehicle comprises:
      communicating, by the device, with the plurality of charging vehicles so as to cause movement of another charging vehicle that is different than the charging vehicle,
      wherein the movement of the other charging vehicle helps the electric vehicle align with the charging vehicle for the in-motion docking.

18. The computer-readable medium as in claim 17, wherein coordinating in-motion docking of the electric vehicle to the charging vehicle comprises:
   navigating the electric vehicle to the charging vehicle; and
   actuating an extender to connect one or more electrodes of the electric vehicle to the charging vehicle.

\* \* \* \* \*

UNITED STATES PATENT AND TRADEMARK OFFICE
CERTIFICATE OF CORRECTION

PATENT NO. : 11,273,727 B2
APPLICATION NO. : 16/296459
DATED : March 15, 2022
INVENTOR(S) : Magnus Mortensen

It is certified that error appears in the above-identified patent and that said Letters Patent is hereby corrected as shown below:

In the Specification

Column 14, Line 3, should read:
(V2I) communication to a service that selects a charg- Column 14, Line 5, should read:
wherein the V2I communication includes navigation Signed and Sealed this
Seventeenth Day of May, 2022

Katherine Kelly Vidal
*Director of the United States Patent and Trademark Office*